United States Patent [19]

Brockman et al.

[11] Patent Number: 5,271,077
[45] Date of Patent: Dec. 14, 1993

[54] NONIMAGING REFLECTOR FOR COUPLING LIGHT INTO A LIGHT PIPE

[75] Inventors: Kacia K. Brockman, McLean, Va.; Timothy Fohl; Pablo A. Vicharelli, both of Carlisle, Mass.

[73] Assignee: GTE Products Corporation, Danvers, Mass.

[21] Appl. No.: 942,532

[22] Filed: Sep. 9, 1992

[51] Int. Cl.⁵ .............................................. G02B 6/26
[52] U.S. Cl. ........................................ 385/31; 385/33; 385/36; 385/39; 385/74; 385/146; 385/901
[58] Field of Search ...................... 385/31, 33, 36, 39, 385/74, 117, 146, 147, 901

[56] References Cited

U.S. PATENT DOCUMENTS

| | | |
|---|---|---|
| 4,237,332 | 12/1980 | Winston ............... 136/259 |
| 4,747,660 | 5/1988 | Nishioka et al. ......... 385/31 |
| 4,767,172 | 8/1988 | Nichols et al. ......... 385/31 |
| 4,883,333 | 11/1989 | Yanez ................. 385/901 |
| 5,021,928 | 6/1991 | Daniel ................. 385/31 |
| 5,022,728 | 6/1991 | Fandrich ............... 385/31 |

OTHER PUBLICATIONS

W. T. Welford et al., *High Collection Nonimaging Optics*, Academic Press (Harcourt Brace Jovanovich), New York (1989) p. 125.

R. Winston et al., "Nonimaging Concentrators (Optics)", *Encyclopedia of Lasers and Optical Technology*, Academic Press (Harcourt Brace Jovanovich), New York (1991) pp. 319-330.

Primary Examiner—Frank Gonzalez
Attorney, Agent, or Firm—Frances P. Craig; William E. Meyer

[57] ABSTRACT

A reflector for coupling light from a light source into an optical waveguide includes input and output ends, a central axis and a reflecting surface disposed around the central axis. A light source, such as an arc lamp, is positioned on the central axis at the input end of the reflector. An input end of an optical waveguide is positioned on the central axis at the output end of the reflector. The reflecting surface has a first section adjacent to the input end with a first curvature that is concave toward the central axis, a second section adjacent to the output end with a second curvature that is concave away from the central axis, and an inflection section between the first and second sections. The first and second curvatures are selected to reflect light through the output end of the reflector within a prescribed range of angles that corresponds to the acceptance angle of the optical waveguide.

12 Claims, 3 Drawing Sheets

NONIMAGING REFLECTOR FOR COUPLING LIGHT INTO A LIGHT PIPE

FIELD OF THE INVENTION

This invention relates to light pipe systems for delivery of high intensity light through an optical waveguide and, more particularly, to a nonimaging reflector for efficient coupling of light from a light source into a light pipe.

BACKGROUND OF THE INVENTION

Optical waveguides, such as optical fibers and light pipes, are commonly used for transmitting light in applications such as illumination, communications, medical applications, and the like. Light is guided through the optical waveguide by total internal reflection when the angle of incidence is within the acceptance angle, or critical angle, of the waveguide.

Light is typically coupled into a light pipe by illuminating an input end of the pipe. The amount of light that can be coupled into the light pipe is limited by the area of the input end and by the brightness of the source. It is conventional practice to use a lens system to focus the output of a light source on the input end of an optical fiber or light pipe. However, no lens system is capable of increasing the brightness of a source. Furthermore, a portion of the focused light may not be within the acceptance angle of the optical waveguide and thus is not transmitted.

Nonimaging concentrators are frequently used for solar energy collection. A concentrator collects energy over a relatively large area and delivers it to a smaller area. A typical concentrator has a reflecting surface that reflects solar energy to an absorber. Because the concentrator has a limited angular field of view, it is often necessary to move the concentrator to follow the sun. Nonimaging concentrators are described generally by R. Winston et al in "Nonimaging Concentrators (Optics)", *Encyclopedia of Lasers and Optical Technology*, Academic Press Inc., 1991, pages 319-330. A nonimaging light direction device is disclosed in U.S. Pat. No. 4,237,332 issued Dec. 2, 1980 to Winston.

Prior art light concentrators have reflecting surfaces with profiles which can be described over most of their length with second order functions. That is, the profiles do not have inflection points. Multiple reflections typically occur in the vicinity of the light source. These reflections produce absorptive losses on the order of 10-15% per reflection. The prior art configurations also tend to direct the light into lossy parts of the source and the mounting structure.

It is a general object of the present invention to provide improved devices for coupling light from a light source into an optical waveguide.

It is another object of the present invention to provide a reflector for efficiently coupling light from a light source into an optical waveguide.

It is a further object of the present invention to provide an optical coupler for coupling light from a source into an optical waveguide with low absorptive losses.

It is yet another object of the present invention to provide a double-ended optical coupler for coupling light from a source into two optical waveguides.

SUMMARY OF THE INVENTION

According to the present invention, these and other objects and advantages are achieved in a light coupler for coupling light from a light source into an optical waveguide. The light coupler comprises a reflector having input and output ends, a central axis and a reflecting surface disposed around the central axis. The reflecting surface has a first section adjacent to the input end with a first curvature that is concave toward the central axis, a second section adjacent to the output end with a second curvature that is concave away from the central axis and an inflection section between the first and second sections. An input end of an optical waveguide is positioned at or near the output end of the reflector. The first and second curvatures are selected to reflect light emitted by a light source positioned on the central axis at or near the input end of the reflector to the input end of the optical waveguide.

The reflector is preferably hollow and increases in cross sectional area with distance from the input end. The first and second curvatures are preferably selected to reflect light emitted by the light source within a prescribed range of angles with respect to the central axis. The prescribed range of angles corresponds to the acceptance angle of the optical waveguide. The first and second curvatures are preferably selected to minimize reflection of light to lossy parts of the light source and to minimize multiple reflections.

The reflector is preferably used in a light delivery system wherein the light source comprises an arc lamp and the optical waveguide comprises a polymer light pipe. The arc lamp is mounted with its longitudinal axis perpendicular to the central axis of the reflector. According to another aspect of the invention, there is provided a double-ended light coupler having a central axis and including a first reflecting surface disposed around the central axis for reflecting light through a first output end and a second reflecting surface disposed around the central axis for reflecting light through a second output end. The light is reflected through the first and second output ends of the light coupler in opposite directions along the central axis. A light source is positioned on the central axis of the light coupler between the first and second reflecting surfaces. The first and second reflecting surfaces each include a first section adjacent to the light source with a first curvature that is concave toward the central axis, a second section adjacent to the respective output end with a second curvature that is concave away from the central axis and an inflection section between the first and second sections. Optical waveguides are positioned at or near the first and second output ends of the light coupler. The first and second curvatures of the reflecting surfaces are selected to reflect light emitted by the light source to the input ends of the respective optical waveguides within a prescribed range of angles with respect to the central axis.

BRIEF DESCRIPTION OF THE DRAWINGS

For a better understanding of the present invention, together with other and further objects, advantages and capabilities thereof, reference is made to the accompanying drawings, which are incorporated herein by reference and in which.

DETAILED DESCRIPTION OF THE INVENTION

Figure 1:
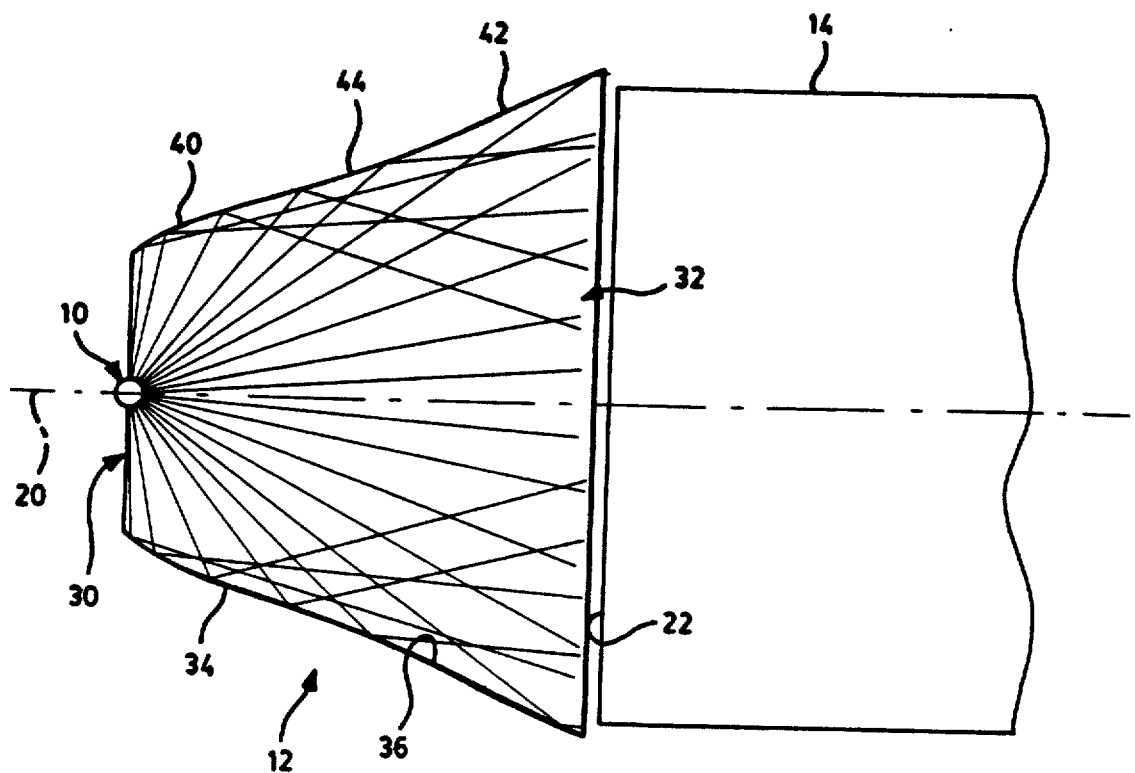
FIG. 1 is a schematic diagram of a light delivery system incorporating a reflector in accordance with the present invention.
Figure 2:
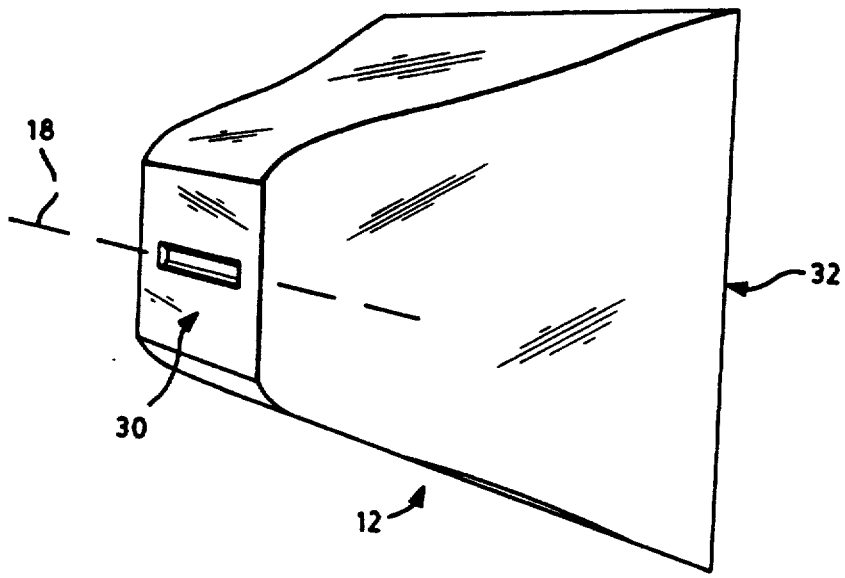
FIG. 2 is a perspective view of the reflector of FIG. 1.

A light delivery system in accordance with the present invention is shown in FIGS. 1 and 2. The basic components of the system are a light source 10, a light coupler 12 and an optical waveguide 14. The light source 10 is typically a high intensity arc discharge lamp. Since high intensity arc discharge lamps are well known in the art, the construction details for such lamps are omitted. Suitable arc lamps include an electrodeless HID lamp as disclosed in U.S. Pat. No. 5,113,121 issued May 12, 1992 to Lapatovich et al, which is hereby incorporated by reference.

The optical waveguide 14 can be an optical fiber, an optical fiber bundle or a glass or polymer light pipe. In a preferred embodiment, a polymer light pipe is utilized. Frequently, high intensity arc discharge lamps emit ultraviolet light. In this case, a shield must be provided for the end of the polymer light pipe to block ultraviolet light which would darken the polymer. In an example of the present invention, a block of heat resistant glass of the same cross section as the light pipe (2 cm×3 cm) and about 4 cm long was joined to the polymer light pipe with index matching material. The light pipe 14 delivers light from source 10 to a desired remote location. Examples of applications of the light delivery system shown in FIG. 1 include marker and brake lights for vehicles, instrument displays and decorative light fixtures.

The purpose of light coupler 12 is to direct as much light as possible from source 10 into an input end 22 of optical waveguide 14 within the acceptance angle of optical waveguide 14. The light coupler 12 has a central axis 20. Preferably, the light source 10 and the input end 22 of the optical waveguide 14 are located on axis 20. Typical acceptance angles for optical waveguides are in the range of about 25° to 40° with respect to axis 20. Light incident on input end 22 of waveguide 14 within the acceptance angle is transmitted by waveguide 14 to its output end, whereas incident light at angles greater than the acceptance angle is not transmitted by waveguide 14.

The light coupler 12 includes an input end 30 and an output end 32. Light source 10 is positioned on axis 20 at or near input end 30. When the light source 10 is an arc lamp, the arc lamp is preferably mounted with its longitudinal axis 18 perpendicular to the central axis 20. The input end 22 of optical waveguide 14 is positioned on axis 20 at or near output end 32. The light coupler 12 includes a substrate 34 that is disposed around central axis 20 and has an inside reflecting surface 36. In a preferred embodiment, the substrate 34 is glass and the reflecting surface 36 is aluminum.

As best shown in FIG. 2, the reflecting surface 36 is elongated in the direction of arc lamp axis 18 for operation with an arc lamp. The cross section of reflecting surface 36 in planes perpendicular to axis 20 is roughly rectangular. Preferably, the corners of the rectangular cross sections are rounded. Alternatively, when the light source is spherical in shape, the reflecting surface preferably has a circular cross section in planes perpendicular to the central axis 20.

The contour of reflecting surface 36 is selected so that a major portion of the light impinging on reflecting surface 36 from light source 10 is reflected to the input end 22 of optical waveguide 14 within a predetermined range of angles. The range of angles is selected to be within the acceptance angle of optical waveguide 14. Additional criteria for selection of the contour of reflecting surface 36 are as follows. Multiple reflections should be minimized in order to control absorptive losses. Preferably, the light from source 10 is reflected no more than once before it reaches input end 22 of optical waveguide 14. Similarly, reflections of light back to source 10 and its associated components should be minimized. These requirements insure that a maximum amount of light emitted by source 10 is coupled into optical waveguide 14.

It has been found that a reflecting surface contour as shown in FIG. 1 is superior to prior art reflectors in meeting these requirements. The reflecting surface 36 includes a first section 40 adjacent to input end 30, a second section adjacent to output end 32 and an inflection section 44 between sections 40 and 42. In the cross section taken along axis 20 as shown in FIG. 1, the first section 40 has a first curvature that is concave toward axis 20. That is, with increasing distance from input end 30, the reflecting surface 36 in section 40 curves toward axis 20. The second section 42 has a second curvature that is concave away from axis 20. That is, with increasing distance from input end 30, the reflecting surface 36 in section 42 curves away from central axis 20. The inflection section 44 contains a transition between the first and second curvatures. The contour of reflecting surface 36 is of the general mathematical form $y = ax + bx^2 + cx^3 + d$, where a, b, c and d are constant coefficients.

The contour of reflecting surface 36 is preferably selected using a ray tracing program. For a given light source 10 and optical waveguide 14, the contour of reflecting surface 36 is varied until a major portion of the light from source 10 that is incident on reflecting surface 36 is reflected to the input end 22 of optical waveguide 14 within the acceptance angle of waveguide 14. It will be understood that the reflecting surface contour depends on the size and shape of light source 10, the size and shape of optical waveguide 14 and the acceptance angle of optical waveguide 14.

By examining the rays traced in FIG. 1, one may see that the optical coupler 12 has a first section 40 having a reflective surface for reflecting light from the light source 10 into the fiber optical 14 such that near input end 30, light from the light source 10 is reflected to generally parallel the optical axis 20. To be within the acceptance angle of the fiber optic means the incoming light ray must be at an angle to the optical axis that is equal to or less than the acceptance angle. Light from the first section 40, should then be reflected at an angle away from the optical axis of no more than the acceptance angle, and being parallel meets the criteria. As the surface is followed from the input end 30 towards the inflection point 44, the light is shown to be reflected at progressively greater angles towards the optical axis 20. Again the maximum angle should be no more than the acceptance angle. Finally, as the surface is followed from the inflection point 44 towards the output end 32, the light is shown to be reflected at progressively smaller angles to the optical axis 20, until the light is again roughly parallel to the optical axis 20, and less than the acceptance angle.

Figure 4:
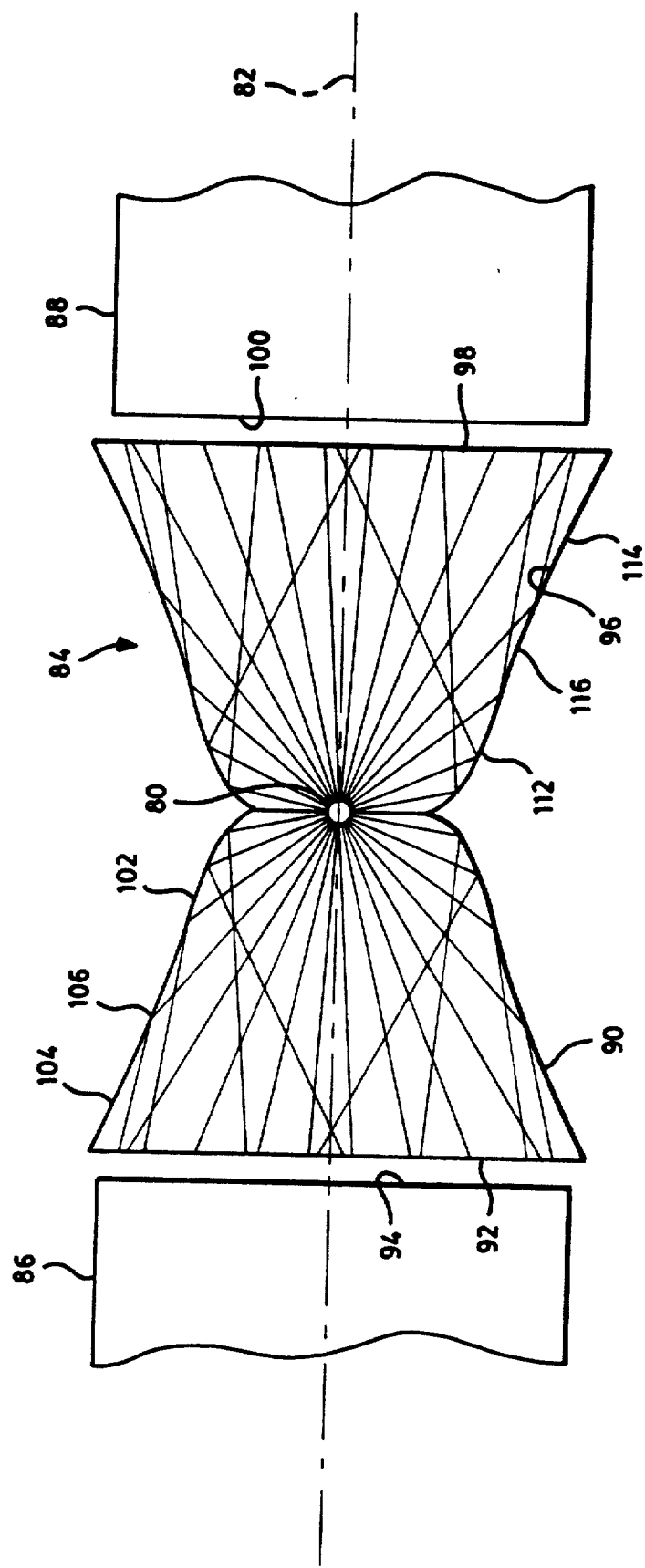
FIG. 4 is a schematic diagram of a light delivery system incorporating a double-ended reflector in accordance with the present invention.

In an example of the present invention, the reflector profile was as shown in FIGS. 2 and 4. The cross section at the output end was 2 cm×3 cm, and the depth was 2 cm. The light source was an arc lamp having an arc that was about 2 mm in diameter and 4 mm long. The reflector was made of aluminum polished on the reflecting surfaces. A glass block, having dimensions of 2 cm×3 cm×4 cm (in length), was used next to the source to withstand heat and ultraviolet radiation. The waveguide was 2 cm×3 cm×30 cm and was made of acrylic plastic (PMMA). The glass and polymer sections were joined with index matching material.

Figure 3:
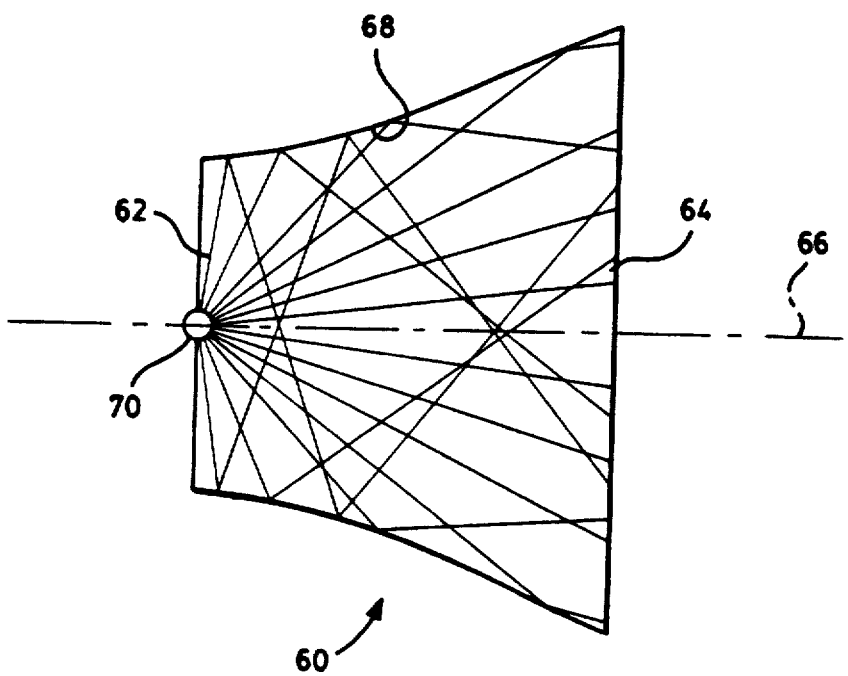
FIG. 3 is a schematic diagram of a reflector in accordance with the prior art showing representative ray traces.

A cross sectional view of a prior art reflector 60 is shown in FIG. 3. The reflector 60 has an input end 62, an output end 64 and a central axis 66. A reflecting surface 68 has circular symmetry about axis 66. A light source 70 is positioned at input end 62 on axis 66. The reflecting surface 68 has a curvature that is concave away from central axis 66 over its entire length. That is, reflecting surface 68 curves away from axis 66 with increasing distance from input end 62. The contour of reflecting surface 68 does not have an inflection point. The ray traces shown in FIG. 3 illustrate that the prior art reflector 60 produces multiple reflections of light originating from source 70. In addition, some of the light is reflected back to source 70. Furthermore, a portion of the light is reflected from surface 68 at a large angle relative to the axis 66 and is outside the acceptance angle of an optical waveguide. As a result, a prior art reflector 60 of the type shown in FIG. 3 is relatively inefficient in coupling light from light source 70 and to an optical waveguide.

A light delivery system incorporating a double ended light coupler in accordance with the present invention is shown in FIG. 4. A light source 80 is positioned on a central axis 82 at the midpoint of a double ended reflector 84. Light from source 80 is directed by light coupler 84 to a first optical waveguide 86 and to a second optical waveguide 88. The double-ended light coupler 84 includes a first reflecting surface 90 disposed around central axis 82 for reflecting light from source 80 through a first output end 92 to an input end 94 of optical waveguide 86. The double-ended light coupler 84 further includes a second reflecting surface 96 disposed around central axis 82 for reflecting light from source 80 through a second output end 98 to an input end 100 of optical waveguide 88. The light source 80 is positioned on axis 82 between reflecting surfaces 90 and 96. Light emitted by source 80 is reflected by surfaces 90 and 96 in opposite directions along axis 82. The configuration of FIG. 4 provides efficient coupling of the light emitted by source 80 into optical waveguides 86 and 88.

The reflecting surface 90 of double-ended light coupler 84 includes a first section 102 adjacent to light source 80, a second section 104 adjacent to output end 92 and an inflection section 106 between sections 102 and 104. Similarly, the reflecting surface 96 includes a first section 112 adjacent to source 80, a second section 114 adjacent to output end 92 and an inflection section 116 between sections 112 and 114. Sections 102 and 112 of reflecting surfaces 90 and 96, respectively, have curvatures that are concave toward central axis 82. Sections 104 and 114 of reflecting surfaces 90 and 96, respectively, have curvatures that are concave away from central axis 82. The inflection sections 106 and 116 are transition regions between curvatures.

As described above, the curvatures of the reflecting surfaces 90 and 96 are selected to reflect light emitted by source 80 through output ends 92 and 98 within a predetermined range of angles with respect to axis 82. The range of angles is selected to correspond with the acceptance of angles of optical waveguides 86 and 88.

As noted above, the optical waveguides 86 and 88 can be optical fibers, optical fiber bundles or glass or polymer light pipes. The optical waveguides 86 and 88 are not necessarily the same. The contours of reflecting surfaces 90 and 96 can be separately tailored to efficiently reflect light to the input ends of the respective optical waveguides. As seen from the ray diagrams shown in FIG. 4, the double-ended light coupler 84 reflects a major portion of the light emitted by light source 80 to the optical waveguides 86 and 88.

The reflecting surfaces shown in FIGS. 1, 2 and 4 can be considered as having contours that are generally S-shaped with an inflection point between curvatures. In each case, the cross section of the reflector in planes perpendicular to its central axis increases monotonically with distance from the input end. Further factors that effect the efficiency of the reflectors include reflectivity and the shape of the corners.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A light coupler for coupling light from a light source into an optical waveguide, comprising:

a reflector having input and output ends, a central axis and a reflecting surface disposed around said central axis, said reflecting surface having a first section adjacent to said input end with a first curvature toward said central axis, a second section adjacent to said output end with a second curvature away from said central axis and an inflection section between said first and second sections, said first and second curvatures being selected to reflect light emitted by a light source positioned on said central axis at or near the input end of said reflector to an input end of an optical waveguide, the input end of said optical waveguide being positioned at or near said output end.

2. A light coupler as defined in claim 1 wherein said reflector is hollow and increases in cross sectional area with distance from said input end in planes perpendicular to said central axis.

3. A light coupler for coupling light from a light source into an optical waveguide, comprising:

a reflector having input and output ends, a central axis and a reflecting surface disposed around said central axis, said reflecting surface having a first section adjacent to said input end with a first curvature that is concave toward said central axis, a second section adjacent to said output end with a second curvature that is concave away from said central axis and an inflection section between said first and second sections, said first and second curvatures being selected to reflect light emitted by a light source positioned on said central axis at said input end to said output end within a prescribed range of angles with respect to said central axis.

4. A light delivery system comprising:

a reflector having input and output ends, a central axis and a reflecting inside surface disposed around said central axis;

a light source positioned on said central axis at or near the input end of said reflector; and an optical waveguide having an input end positioned at or near the output end of said reflector to receive light from said light source, said reflecting surface having a first section adjacent to said light source with a first curvature that is concave toward said central axis, a second section adjacent to said optical waveguide with a second curvature that is concave away from said central axis and an inflection section between said first and second sections, said first and second curvatures being selected to reflect light emitted by said light source to the input end of said optical waveguide within a prescribed range of angles with respect to said central axis.

5. A light delivery system as defined in claim 4 wherein said light source comprises an arc lamp having a longitudinal axis perpendicular to said central axis.

6. A light delivery system as defined in claim 4 wherein said optical waveguide comprises a polymer light pipe.

7. A light delivery system comprising:
 a double-ended light coupler having a central axis and including a first reflecting surface disposed around the central axis for reflecting light through a first output end and a second reflecting surface disposed around the central axis for reflecting light through a second output end;
 a light source positioned on the central axis of said light coupler between said first and second reflecting surfaces;
 a first optical waveguide having an input end positioned at or near the first output end of said light coupler for receiving light from said light source; and
 a second optical waveguide having an input end positioned at or near the second output end of said light coupler for receiving light from said light source, said first and second reflecting surfaces each including a first section adjacent to said light source with a first curvature that is concave toward said central axis, a second section adjacent to the respective optical waveguide with a second curvature that is concave away from said central axis and an inflection section between said first and second sections, said first and second curvatures being selected to reflect light emitted by said light source to the input end of the respective optical waveguide within a prescribed range of angles with respect to said central axis.

8. A light delivery system as defined in claim 7 wherein said first and second reflecting surfaces increase in cross sectional area with distance from said light source in planes perpendicular to said central axis.

9. A light delivery system as defined in claim 7 wherein said light source comprises an arc lamp having a longitudinal axis perpendicular to said central axis.

10. A light delivery system as defined in claim 7 wherein said first and second optical waveguides comprise polymer light pipes.

11. A light coupler for coupling light from a light source into an optical waveguide having an acceptance angle, comprising:
 a reflector having input and output ends, a central axis and a reflecting surface disposed around the central axis, the reflecting surface having a first section adjacent to the input end, and a second section adjacent to the output end, an inflection section between the first and second sections, wherein the reflective surface for reflecting light from the light source into the fiber optical along the first section is formed such that near the input end, light from the light source is reflected towards the optical waveguide at an angle away from the central axis, and as the reflective surface is followed from the input end towards the inflections section, the light is reflected at progressively smaller angles away from the central axis, until parallel with the central axis, and then at progressively greater angles towards the central axis, and as the reflective surface is followed from the inflection section towards the output end, the light is reflected towards the central axis at progressively smaller angles, until parallel with the central axis, and then reflected at progressively greater angles away from the central axis.

12. The optical coupler in claim 11, wherein reflective surface is formed so the light from the optical source is substantially reflected towards the optical fiber at angles to the central axis at less than the acceptance angle of the optical fiber.

* * * * *